(12) United States Patent
Jochemczyk et al.

(10) Patent No.: US 9,766,138 B2
(45) Date of Patent: Sep. 19, 2017

(54) TEMPERATURE MEASURING DEVICE AND METHOD FOR TEMPERATURE MEASUREMENT OF THE AMBIENT AIR OF A VEHICLE

(71) Applicant: Bayerische Motoren Werke Aktiengesellschaft, Munich (DE)

(72) Inventors: Claus Jochemczyk, Munich (DE); Thorben Guenzel, Braunschweig (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 326 days.

(21) Appl. No.: 14/591,615

(22) Filed: Jan. 7, 2015

(65) Prior Publication Data
US 2015/0192479 A1 Jul. 9, 2015

(30) Foreign Application Priority Data
Jan. 8, 2014 (DE) ........................ 10 2014 200 142

(51) Int. Cl.
*G01K 11/22* (2006.01)
*G01K 1/00* (2006.01)
*G01K 13/00* (2006.01)
*G01K 13/02* (2006.01)
*G01K 1/20* (2006.01)
*G01S 15/93* (2006.01)
*G01S 7/52* (2006.01)

(52) U.S. Cl.
CPC .............. *G01K 13/02* (2013.01); *G01K 1/20* (2013.01); *G01K 2013/024* (2013.01); *G01K 2205/00* (2013.01); *G01S 7/52006* (2013.01); *G01S 15/931* (2013.01)

(58) Field of Classification Search
USPC ................. 374/148, 144, 138, 208, 117, 119
See application file for complete search history.

(56) References Cited

U.S. PATENT DOCUMENTS

| 4,336,712 A | 6/1982 | Hawkins |
| 6,088,661 A * | 7/2000 | Poublon ................. F02D 41/18 374/133 |
| 6,655,833 B1 | 12/2003 | Melin |
| 2004/0103679 A1* | 6/2004 | Ichishi ............... B60H 1/00271 62/244 |

(Continued)

FOREIGN PATENT DOCUMENTS

| DE | 39 18 245 A1 | 12/1990 |
| DE | 198 16 456 C1 | 6/1999 |

(Continued)

OTHER PUBLICATIONS

German Search Report dated Sep. 11, 2014, with Statement of Relevancy (Seven (7) pages).

*Primary Examiner* — Mirellys Jagan
(74) *Attorney, Agent, or Firm* — Crowell & Moring LLP

(57) ABSTRACT

The invention relates to a temperature measuring device for measurement of the external temperature of the ambient air in a vehicle, wherein the temperature measuring device is disposed in a flow path of an air flow and the air flow can be generated from ambient air of the vehicle both through speed-dependent wind resistance of the vehicle and/or wind and also through a compressor unit disposed in the flow path.

15 Claims, 2 Drawing Sheets

(56) References Cited

U.S. PATENT DOCUMENTS

| | | | |
|---|---|---|---|
| 2005/0071074 A1* | 3/2005 | Super | F02D 41/021 701/102 |
| 2008/0159354 A1* | 7/2008 | Fleming | G01K 13/028 374/138 |
| 2008/0295530 A1* | 12/2008 | Sawada | B60H 1/3205 62/129 |
| 2012/0051388 A1* | 3/2012 | Hamama | F02D 41/222 374/1 |
| 2012/0307863 A1* | 12/2012 | Tada | G01K 13/02 374/144 |
| 2012/0323440 A1* | 12/2012 | Dehart | G01K 1/16 701/36 |
| 2013/0070804 A1* | 3/2013 | Hawkins | G01K 7/42 374/1 |
| 2013/0179032 A1* | 7/2013 | Kyrtsos | B60H 1/00807 701/36 |
| 2014/0044149 A1* | 2/2014 | Matsuura | G01K 7/427 374/145 |
| 2014/0269823 A1* | 9/2014 | Hubert | G01K 3/04 374/102 |
| 2016/0361975 A1* | 12/2016 | Blatchley | B60H 1/3214 |

FOREIGN PATENT DOCUMENTS

| | | |
|---|---|---|
| DE | 198 36 611 A1 | 3/2000 |
| DE | 100 20 958 A1 | 10/2001 |
| DE | 198 53 462 C2 | 8/2003 |
| DE | 10 2004 016 267 A1 | 10/2005 |
| EP | 1 927 832 A1 | 6/2008 |

* cited by examiner

TEMPERATURE MEASURING DEVICE AND METHOD FOR TEMPERATURE MEASUREMENT OF THE AMBIENT AIR OF A VEHICLE

CROSS REFERENCE TO RELATED APPLICATION

This application which claims priority under 35 U.S.C. §119 from German Patent Application No. 10 2014 200 142.0, filed Jan. 8, 2014, the entire disclosure of which is herein expressly incorporated by reference.

BACKGROUND AND SUMMARY OF THE INVENTION

The invention relates in general to the field of sensors of driver assistance systems. In particular the invention relates to the correct detection of the temperature of ambient air for determining the current sound velocity, preferably for a distance measurement by means of ultrasound sensors on a motor vehicle.

For assisting a driver of the vehicle when maneuvering a vehicle, in particular parking and leaving a parking place, modern vehicles are equipped with a so-called parking system. Such parking systems are associated with the driver assistance system as parking assistance systems. Parking systems are usually based on distance measurements with ultrasound sensors and monitor a region of approximately 20 to 250 cm behind and, as the case may be, in front of the vehicle. An ultrasound sensor consists, for example, of an aluminum membrane, on the inner face of which a piezo-ceramic oscillator in the form of a thin disc for transmission and reception of ultrasonic signals is fastened. The electronics necessary for control and signal processing is generally located on a small circuit board screened off in a sensor housing. DE 198 16 456 C1 shows an example of such an ultrasound sensor.

In ultrasonic distance measurement the distance of the vehicle from an obstacle is ascertained according to the echo sounding principle from the propagation time between transmission and reception and also on the basis of the propagation speed of sound in the propagation medium (in this case in the ambient air). The ascertained distance is indicated to the driver optically and/or acoustically for orientation and/or warning.

$$c_\Sigma = (331.5 + 0.596 \cdot \Sigma) m/s.$$

Thus, for correctly ascertaining the distance by means of ultrasound sensors an exact determination of the external temperature is necessary.

DE 100 20 958 A1 shows for example the carrying out of a corresponding temperature compensation for a plurality of ultrasound sensors centrally in a control device which is connected to a temperature sensor of the vehicle.

Conventional temperature measurement sensors have a precision of less than 1° C., but because of the installation location in the vehicle, problems occur in the determination of the correct air temperature outside the vehicle. The nearer the external temperature sensor is installed relative to heat sources, such as for example the engine or the exhaust gas system or a brake of the vehicle, the greater is the deviation of the actual air temperature and a measured value from the temperature sensor. Irrespective of the installation location, a vehicle which is stationary or travelling at low speed heats up. Usual reasons for this are for example sunlight falling on the vehicle and/or thermal convection from the ground surface, for example hot asphalt, and/or waste heat from the engine or the exhaust gas system. Therefore, when stationary or travelling slowly a correct determination of the external temperature by means of the temperature sensor is no longer possible. At higher vehicle speeds, for example above 80 km/h, these heating effects do not occur because of the wind resistance.

Therefore, the temperature sensor is preferably integrated at a location in the vehicle which is exposed to the wind resistance and a measured value from the temperature sensor is usually used only above a predetermined vehicle speed. At low speeds, the last temperature measured at higher speeds is used, and is maintained for a variable holding time (generally several hours).

The measurement of lower temperatures at lower speeds constitutes an exception. Since in this case heating effects play no part and the driver should be warned as early as possible of the danger of slippery conditions, for example at approximately 3° C. and below, measured temperature values which are lower than the previously applicable external temperature value, irrespective of the speed of travel, are immediately adopted.

However, for a parking assistance system an exact determination of the temperature of the ambient air, especially at low vehicle speeds, i.e., less than 5 km/h, is necessary in order to correctly ascertain the distance. As explained above, in this case often only "maintained" measured temperature values are available. In various situations, this may lead to an incorrect external temperature being assumed. For example, when travelling from a cold environment, such as a car park or an underground garage or a garage, into a significantly warmer environment, when starting the engine in a warm environment, when driving through a cold tunnel comprising with subsequent travel into the warmer environment outside the tunnel, when driving in the mountains with a temperature gradient, to name only a few cases which are relevant in practice.

The more the external temperature value used for the ultrasound-based distance measurement deviates from the real temperature of the ambient air, the greater the error in the distance calculation is.

A method for temperature compensation in a distance measurement with ultrasound is known from DE 10 2004 016 267 A1, wherein a distance from an obstacle is determined independently of the temperature solely from the propagation times measured in each case by the at least three ultrasound sensors and the data from the three-dimensional arrangement of the sensors relative to one another, because in the calculation of the distance the sound velocity and thus the temperature-dependent value is reduced. However, in this method a suitable environment or a test obstacle is necessary for the calibration of the system.

It is a possible object of the present invention to propose an improved method for distance measurement by means of ultrasound sensors for use in a vehicle, as well as a correspondingly improved distance measurement system, in particular a parking assistance system improved by means of temperature compensation even at low speeds.

This object is achieved by the features of the independent claims. Further features and details of the invention are apparent from the subordinate claims, the description and the drawings.

In this case, features and details which are described in connection with the driver assistance system according to the invention also of course apply in connection with a corresponding method and in each case vice versa, so that with respect to the disclosure reference is or can be always made reciprocally to the individual aspects.

A fundamental idea underlying the invention resides in an improved determination of the external temperature of a vehicle, i.e., the air temperature outside the vehicle, particularly in the low speed range. Within the context of the invention it has been recognized amongst other things that on this basis for example the distinction from obstacles/objects in the case of ultrasound-based driver assistance systems can be ascertained significantly more precisely and reliably. The invention is suitable in particular for use in the low speed range for parking assistance systems. Furthermore, the driver can also be informed better and more quickly by means of the current external temperature in the entire speed range.

A first aspect of the invention relates to a temperature measuring device for measurement of the external temperature of the ambient air in a vehicle. The temperature measuring device is preferably disposed in a flow path of an air flow. According to the invention, the air flow from the ambient air of the vehicle can be generated both by speed-dependent wind resistance of the vehicle and/or wind and also by a compressor unit disposed in the flow path.

The compressor unit is preferably configured as a fan or a blower. The compressor unit may be disposed in the flow path in front of or behind the temperature measuring device. Particularly, preferably the compressor unit and the temperature measuring device are disposed in the immediate proximity of one another, so that the compressor unit and the temperature measuring device can be integrated in a common housing.

The compressor unit is preferably configured to detect a current flow rate of the air flow and/or a current speed of the compressor unit. Alternatively, an additional measuring device for measuring the flow rate of the air flow can also be disposed in the flow path. The temperature measuring device can also be coupled to a control unit for the compressor unit. Based upon a detected flow rate and/or based upon the current speed and a current power consumption of the compressor unit, the control unit may be configured to control the output of the compressor unit. Thus, it is possible to adjust a predetermined air flow for the temperature measuring device.

The control unit is preferably configured to disconnect the compressor or set it to idle operation unit at a predetermined flow rate or vehicle speed. This protects the compressor unit and avoids unnecessary power consumption by the compressor unit.

A second aspect of the invention relates to a control device for providing a temperature-compensated sound velocity value, preferably for a temperature-compensated distance measurement with ultrasound. For this purpose the control device is coupled to a temperature measuring device according to the invention, and is configured to determine a current sound velocity based upon a temperature of the ambient air currently registered by the temperature measuring device.

A third aspect of the invention relates to a motor vehicle with a temperature measuring device according to the invention, or with a control device according to the invention for providing a temperature-compensated sound velocity value, preferably for a temperature-compensated distance measurement with ultrasound.

A fourth aspect of the invention relates to a method for measurement of the external temperature of the ambient air in a vehicle with a temperature measuring unit. The method comprises the following steps: generating an air flow from a speed-dependent wind resistance of the vehicle and/or wind and additionally by means of a compressor unit; and supplying the temperature measuring unit with the air flow. The method may preferably also include: controlling the output of the compressor unit based on a current flow rate of the air flow and/or a current speed of the vehicle.

A fifth aspect of the invention relates to a method for providing a temperature-compensated sound velocity value, preferably for a temperature-compensated distance measurement with ultrasound, based on one of the above-mentioned methods according to the invention for measurement of the current external temperature of the ambient air in the vehicle. An external temperature of the ambient air currently measured by the temperature measuring unit is used, as soon as a predetermined flow rate of the air flow is present, for calculation of the current sound velocity in the ambient air.

Further advantages, features and details of the invention are apparent from the following description in which embodiments of the invention are described in detail with reference to the drawings. In this case the features mentioned in the claims and in the description may in each case be essential to the invention individually or in any combination. Likewise the features referred to above and the further features set out here can each be used alone in any combinations. Some structural parts or components which are functionally similar or identical are provided with the same references. The expressions used in the description of the embodiments "left", "right", "top" and "bottom" relate to the drawings in an orientation with normally readable figure designation or normally readable reference signs. The embodiments shown and described should not be understood as definitive, but rather as examples for explanation of the invention. The detailed description serves for information for the person skilled in the art, therefore known circuits, structures and methods are not shown or explained in detail in the description, in order not to make it difficult to understand the present description not to making.

DETAILED DESCRIPTION OF THE DRAWINGS

Figure 1:
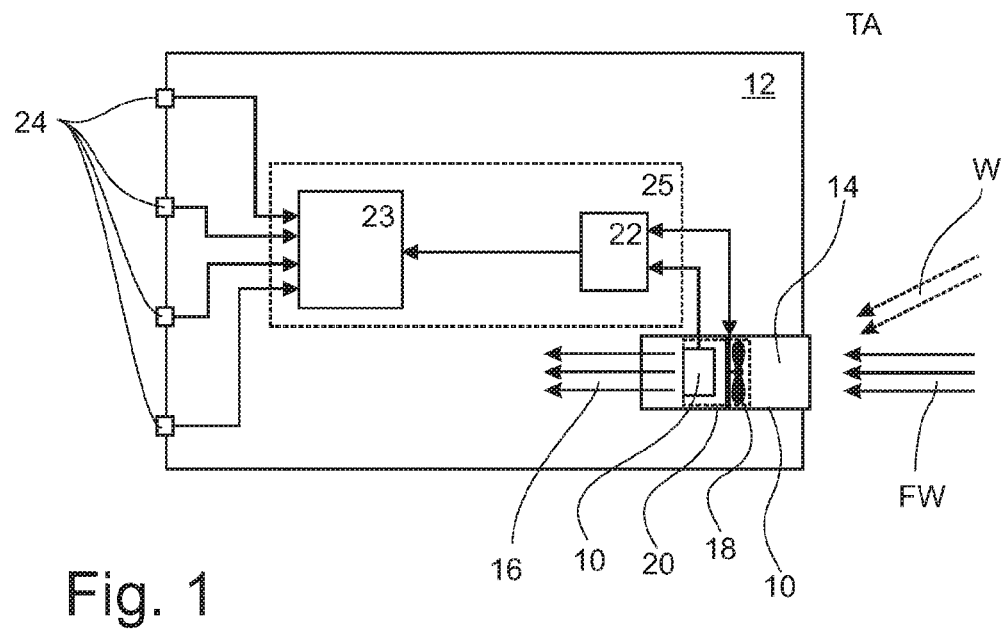
FIG. 1 shows schematically a vehicle with a temperature measuring device for detecting the actual air temperature outside the vehicle and also with a device for temperature-compensated distance measurement with ultrasound.

FIG. 1 shows schematically a vehicle 12 with a temperature measuring device 10 with a temperature measurement sensor (not shown) for measurement of the current or actual external temperature TA of the ambient air outside the vehicle 12. As explained in the introduction, an improvement in the determination of the temperature of the external air is necessary for increased precision when ascertaining the distance on the basis of ultrasound.

In this embodiment, the temperature measuring device 10 is disposed in a flow path 14 of an air flow 16. The flow path 14 may for example be a tube or an air channel, of which the access surface is aligned with the normal direction of travel of the vehicle 12. In other words, the position of the temperature measuring device 10 is optimized so that it has the best possible access for air flow through the wind resistance FW. It is preferably ensured that the temperature measuring device 10 is not located in the immediate region of heat sources of the vehicle 12. In the range close to a standstill, i.e., for example at travel speeds below 5 km/h, the wind resistance FW is not sufficient in order to supply the temperature measuring device 10 with sufficient ambient air, so that the actual temperature of the ambient air can be measured.

Through the flow path 14, the air flow 16 of ambient air of the vehicle 12 is supplied both by the speed-dependent wind resistance FW of the vehicle 12 and/or the wind W prevailing at the location of the vehicle.

Figure 2:
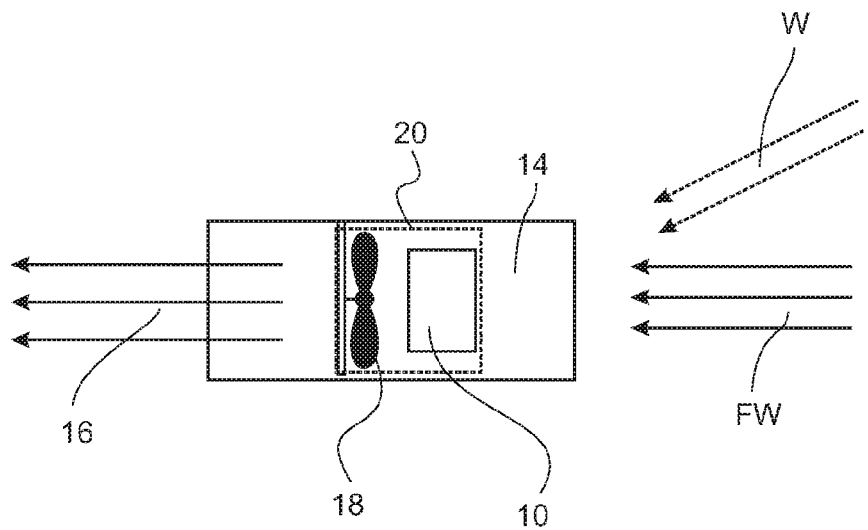
FIG. 2 shows an alternative embodiment of the temperature measuring device.

In addition, a compressor unit 18 is disposed in the flow path 14. The compressor unit 18 is a fan or a blower. The compressor unit 18 can be disposed upstream of the temperature measuring device 10 as shown in FIG. 1, or can be disposed downstream of the temperature measuring device 10 as shown in the alternative embodiment of FIG. 2. The compressor unit 18 and the temperature measuring device 10 are integrated as a compact unit into a common housing 20.

Thus, the air flow 16 is generated by the following influencing factors: (i) wind resistance FW as a function of the vehicle speed, (ii) external wind flow W as a function of the wind strength and wind direction and (iii) current output of the compressor unit 18.

The compressor unit 18 is configured to detect a current flow rate of the air flow 16 and/or a current speed of the compressor unit 18. In other words, the flow rate between the compressor unit 18 and the temperature measuring device 10 can be measured simultaneously with the aid of the compressor unit 18.

The temperature measuring device 10 is also coupled to a control unit 22 for the compressor unit 18. Based upon the flow rate detected by means of the compressor unit 18 or based upon the speed and a current power consumption of the compressor unit 18, the control unit 22 is substantially configured to control the output of the compressor unit 18. This can take place for example by means of setting the supply voltage or one the current for an electric motor which drives the compressor unit 18.

When the vehicle 12 is stationary or in the speed range of the vehicle 12 close to a standstill, the quantity of air of the air flow 16 necessary for the correct temperature measurement can be ensured by the compressor unit 18. In other words, the less wind resistance FW and/or wind W there is, the more air flow 16 is generated through the compressor unit 18. Since the wind resistance FW is directly proportional to the speed of the vehicle 12, it is also the case that the higher the speed of the vehicle 12 is, the less air flow 16 is generated by the compressor unit 18 in addition to the air flow 16 through the wind resistance FW.

The control unit 22 is further configured to set the compressor unit 18 to idle operation or to disconnect it at a predetermined flow which is sufficient for a correct temperature measurement. Alternatively, this can also take place at a corresponding vehicle speed since the vehicle speed is proportional to the generated wind resistance FA. In other words, in order to protect the compressor unit 18, idle operation is provided as soon as a sufficient air flow 16 is achieved through the wind resistance FW or the wind W.

As soon as a sufficient air flow 16 is present, the measured value of the temperature measuring device 10 can be used for temperature compensation of an ultrasound-based distance measurement.

The control unit 22 can be configured to provide a measured value of the temperature measuring device 10 for further use in other equipment of the vehicle 12, for example via a telegram to a communication bus (for example a CAN bus) of the vehicle 12, only when the flow rate lies a predetermined time period above a predetermined threshold value.

As is also shown schematically in FIG. 1, the control unit 22 is coupled to a control device 23 of a distance measuring device of the vehicle 12 for temperature-compensated distance measurement with ultrasound. This may be a distance measurement of a parking assistance system.

The distance measuring device has at least one ultrasound sensor 24 (in this case: four of them, which are disposed in the region of the rear bumper of the vehicle 12) for distance measurement by means of the echo sounding principle. The control device 23 is configured to determine the current sound velocity based upon a temperature TA of the ambient air currently registered by the temperature measuring device 10 for the determination of a distance measured by the at least one ultrasound sensor 24. This may for example be calculated by means of the correlation given in the introduction between the sound velocity in air and the current temperature of the air in the control device 23.

It may be noted that the control unit 22 and the control device 23 can also both be integrated in a common control of the vehicle 12, such as for example a control device 25.

In other words, FIG. 1 shows a motor vehicle 12 with a temperature measuring device 10 and a distance measuring device.

Figure 3:
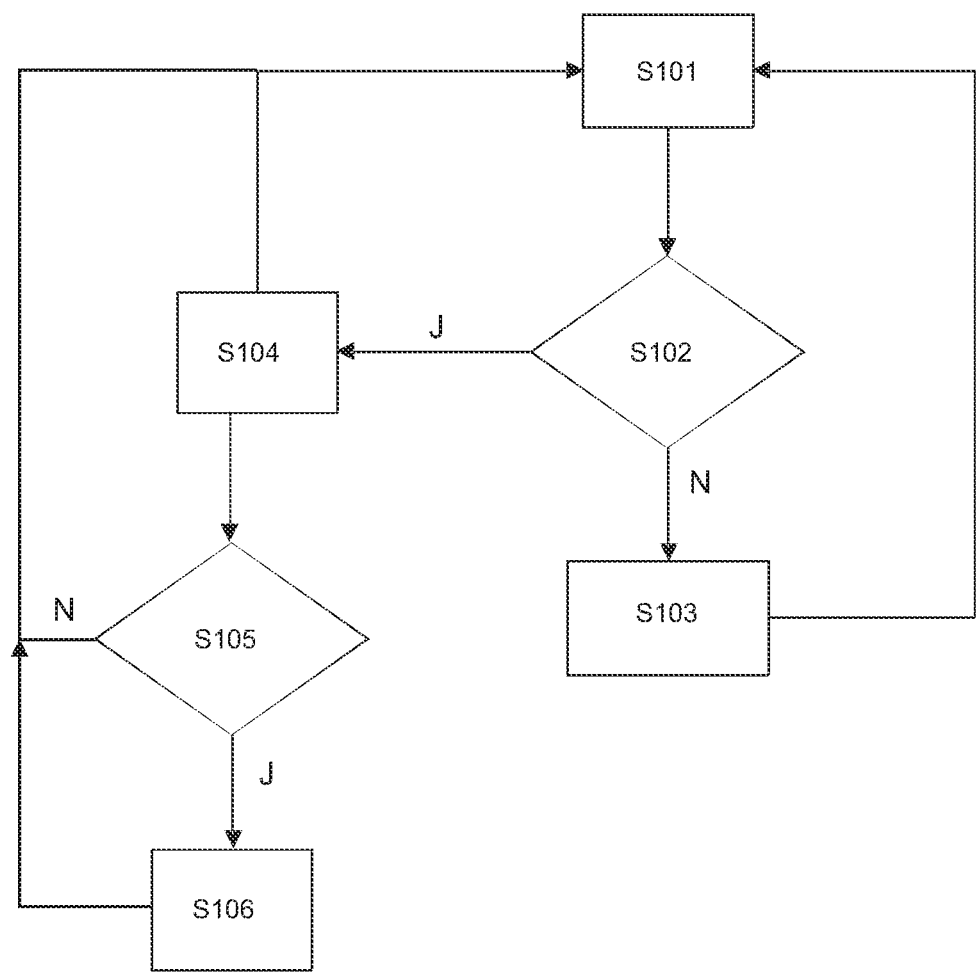
FIG. 3 shows a flow diagram with a method for measurement the actual external temperature of the ambient air in a vehicle for a method for temperature-compensated distance measurement with ultrasound in the vehicle.

FIG. 3 first of all illustrates a method for measurement of the actual external temperature TA of the ambient air for example in the vehicle 12 of FIG. 1 with the temperature measuring unit 10 shown there.

In step S101, the current flow rate of the air flow is registered on the temperature measuring unit 10, for example after starting of the vehicle 12.

In step S102 the registered flow rate is compared with a predetermined threshold value. If the result of the comparison in step S102 is that the flow rate is too low, the method moves to step S103.

In step S103 the air flow 16, which is initially always composed of a part which originates from the speed-dependent wind resistance FW of the vehicle 12, and if applicable a part which is attributable to wind W in the surroundings of a vehicle, is increased. Since the air flow 16 is too low, if the method is at step S103, additional air flow 16 is generated in step S103 by increasing the output of the compressor unit 18, and thus supplies the temperature measuring unit 10 with an increased air flow 16. Then the method goes back to step S101.

If the result of the comparison in step S102 is that the flow rate is greater than or equal to the predetermined flow rate, the method moves to step S104.

In step S104, the output of the compressor unit 18 is maintained if the flow rate is equal to the predetermined flow rate, and is reduced if the flow rate is greater than the predetermined flow rate.

It goes without saying that this control can be based on the current flow rate of the air flow 16 and/or a current speed of the vehicle 12.

Since the flow rate is in principle sufficient as soon as the method reaches step S104, the temperature measuring unit 10 can determine the actual air temperature of the surroundings of the vehicle 12.

In order to increase the reliability of the measurement, however, the method initially moves to step S105, in which, as an additional condition, a check is performed as to whether a predetermined time interval (safety interval) has elapsed before a current measured temperature value is trusted. The safety interval can be monitored with a timer which is activated as soon as the method arrives at step S104 for the first time after starting. In other words, when the preset time interval has not yet elapsed, i.e., the temperature measuring unit 10 has not yet been supplied for the predetermined period of time with the sufficiently high air flow, then the method moves from step S105 directly to step S101.

When the predetermined time interval is elapsed the method moves from step S105 to step S106. It is also possible to dispense with the safety time interval, then alternatively the method moves directly from step S104 to step S106. For example, as an alternative to the time interval as a safety measure, the threshold for the flow rate or vehicle speed can also be increased, for example also only temporarily.

In step S106, a calculation of the current sound velocity in the ambient air takes place based upon the current temperature value. The sound velocity value which is temperature-compensated in such a way can then be used in the vehicle 12 for a more precise distance measurement with ultrasound. From step S106 the method goes back to step S101.

The output of the compressor unit 18 is preferably regulated as a function of the measured flow rate on the compressor unit 18, until a sufficient flow rate is present. As soon as the threshold value for the flow rate is exceeded, the measured value of the external temperature TA can be used independently of the vehicle speed.

As already explained, it is also possible that the regulation of the compressor unit 18 takes place depending upon the current vehicle speed instead of depending upon the current flow rate. In other words, the slower the vehicle moves, the more air flow 16 must be generated by the compressor unit 18. On the other hand, above a limiting speed it may be assumed that there is a sufficient flow, so that the idle operation of the compressor unit 18 can be used.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle comprising:
    a temperature measuring device for measurement of an external temperature of ambient air of the vehicle, wherein the temperature measuring device is disposed in a flow path of an air flow generated from ambient air of the vehicle both through (i) speed-dependent wind resistance of the vehicle and/or wind, and (ii) through a compressor unit disposed in the flow path; and
    a control device configured to provide a temperature-compensated sound velocity value for a temperature-compensated distance measurement with ultrasound, wherein the control device is coupled to the temperature measuring device, and wherein the control device is configured to ascertain a current sound velocity based upon a temperature of the air flow currently measured by the temperature measuring device.

2. The vehicle according to claim 1, wherein the compressor unit is configured to detect at least one of a current flow rate of the air flow and a current speed of the compressor unit.

3. The vehicle according to claim 2, wherein the temperature measuring device is further coupled to a control unit for the compressor unit, wherein based upon a flow rate detected by the compressor unit or based upon the speed and a current power consumption of the compressor unit, the control unit is configured to control the output of the compressor unit.

4. The vehicle according to claim 3, wherein the control unit is configured to disconnect the compressor unit or set it to idle operation at one of a predetermined flow rate and a vehicle speed.

5. The vehicle according to claim 1, wherein the compressor unit is one of a fan and a blower, and wherein the compressor unit and the temperature measuring device are integrated into a common housing.

6. The vehicle according to claim 5, wherein the compressor unit is configured to detect at least one of a current flow rate of the air flow and a current speed of the compressor unit.

7. The vehicle according to claim 6, wherein the temperature measuring device is further coupled to a control unit for the compressor unit, wherein based upon a flow rate detected by the compressor unit or based upon the speed and a current power consumption of the compressor unit, the control unit is configured to control the output of the compressor unit.

8. The vehicle according to claim 7, wherein the control unit is configured to disconnect the compressor unit or set it to idle operation at one of a predetermined flow rate and a vehicle speed.

9. A control device configured to provide a temperature-compensated sound velocity value for a temperature-compensated distance measurement with ultrasound, wherein the control device is coupled to a temperature measuring device that is disposed in a flow path of air flow generated from ambient air of the vehicle both through (i) speed-dependent wind resistance of the vehicle and/or wind, and (ii) through a compressor unit disposed in the flow path, and
    wherein the control device is configured to ascertain a current sound velocity based upon a temperature of the ambient air currently registered by the temperature measuring device.

10. The control device according to claim 9, wherein the compressor unit is one of a fan and a blower, and wherein the compressor unit and the temperature measuring device are integrated into a common housing.

11. The control device according to claim 9, wherein the compressor unit is configured to detect at least one of a current flow rate of the air flow and a current speed of the compressor unit.

12. The control device according to claim 9, wherein the temperature measuring device is further coupled to a control unit for the compressor unit, wherein based upon a flow rate detected by the compressor unit or based upon the speed and a current power consumption of the compressor unit, the control unit is configured to control the output of the compressor unit.

13. The control device according to claim 9, wherein the control unit is configured to disconnect the compressor unit or set it to idle operation at one of a predetermined flow rate and a vehicle speed.

14. A method for providing a temperature-compensated sound velocity value for a temperature-compensated distance measurement with ultrasound in a vehicle, the method comprising:
    generating an air flow of ambient air of the vehicle from (i) a speed-dependent wind resistance of the vehicle and/or wind, and (ii) by a compressor unit;

supplying a temperature measuring unit with the air flow of ambient air;

measuring, by the temperature measurement unit, a temperature of the air flow; and ascertaining a current sound velocity based upon said measured temperature of the air flow of ambient air.

15. The method according to claim 14, wherein control of the output of the compressor unit based on a current flow rate of the air flow and/or a current speed of the vehicle.

\* \* \* \* \*